US011780556B2

(12) United States Patent
Tao et al.

(10) Patent No.: US 11,780,556 B2
(45) Date of Patent: Oct. 10, 2023

(54) METHODS AND APPARATUS FOR SPACE-EFFICIENT AIRCRAFT DEPLOYMENT

(71) Applicant: Aurora Flight Sciences Corporation, a subsidiary of The Boeing Company, Manassas, VA (US)

(72) Inventors: Tony Shuo Tao, Arlington, MA (US); Lauren Trollinger Wolfe, Manassas, VA (US); Lansing Wei, Manassas, VA (US); Francesco Giannini, Falls Church, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 17/526,641

(22) Filed: Nov. 15, 2021

(65) Prior Publication Data

US 2023/0150648 A1    May 18, 2023

(51) Int. Cl.
*B64C 3/56* (2006.01)
*B64D 17/80* (2006.01)
*B64C 3/30* (2006.01)
*B64C 3/18* (2006.01)

(52) U.S. Cl.
CPC ............... *B64C 3/56* (2013.01); *B64C 3/185* (2013.01); *B64C 3/30* (2013.01); *B64D 17/80* (2013.01)

(58) Field of Classification Search
None
See application file for complete search history.

(56) References Cited

U.S. PATENT DOCUMENTS

| | | | |
|---|---|---|---|
| 9,896,188 B1 * | 2/2018 | Joo | B64C 3/187 |
| 10,435,149 B2 | 10/2019 | Hefner et al. | |
| 10,442,521 B1 * | 10/2019 | Ellzey | B64C 5/12 |
| 10,507,929 B1 * | 12/2019 | Vander Lind | B64D 17/725 |
| 10,717,526 B2 | 7/2020 | Hefner et al. | |
| 2012/0211598 A1 * | 8/2012 | Lutke | B64C 3/385 244/75.1 |
| 2016/0178317 A1 * | 6/2016 | Powell | F41F 3/07 89/1.813 |
| 2019/0023374 A1 | 1/2019 | Kahlon et al. | |
| 2021/0253219 A1 | 8/2021 | Noskowicz | |

\* cited by examiner

*Primary Examiner* — Brady W Frazier
*Assistant Examiner* — Nevena Aleksic
(74) *Attorney, Agent, or Firm* — Hanley, Flight & Zimmerman, LLC

(57) ABSTRACT

Methods and apparatus are disclosed for deployable wing portions of an aircraft. An example method of deploying an aircraft includes separating the aircraft from a launch vehicle, the aircraft having a wing pivotably coupled to a fuselage, rotating, about an axis of rotation, the wing relative to the fuselage from a first rotational orientation to a second rotational orientation different from the first rotational orientation, wherein, in the first rotational orientation, the wing extends along a direction that substantially aligns with a longitudinal axis of the fuselage, and extending the wing in a lateral direction away from the fuselage in the second rotational orientation.

22 Claims, 15 Drawing Sheets

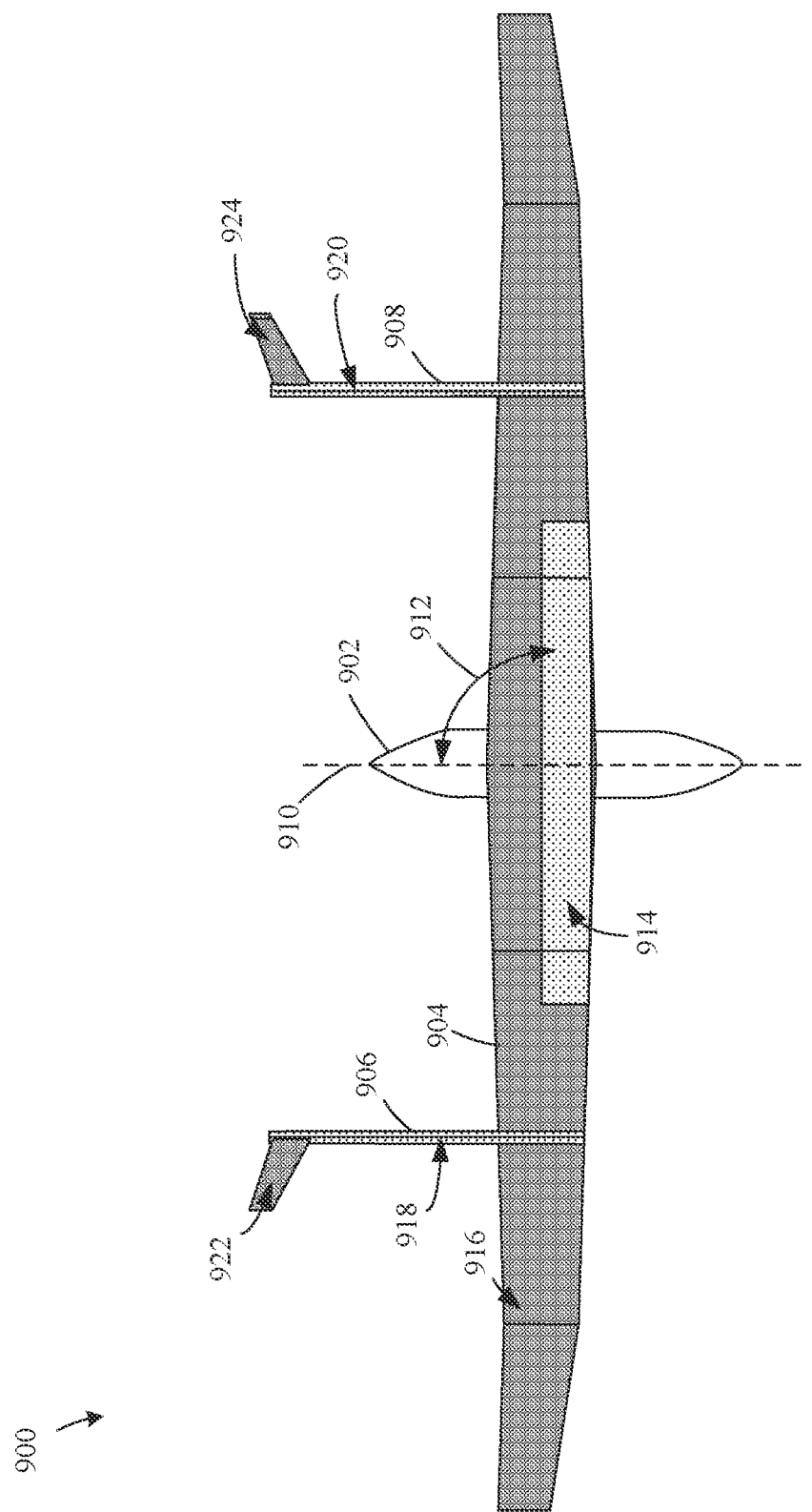

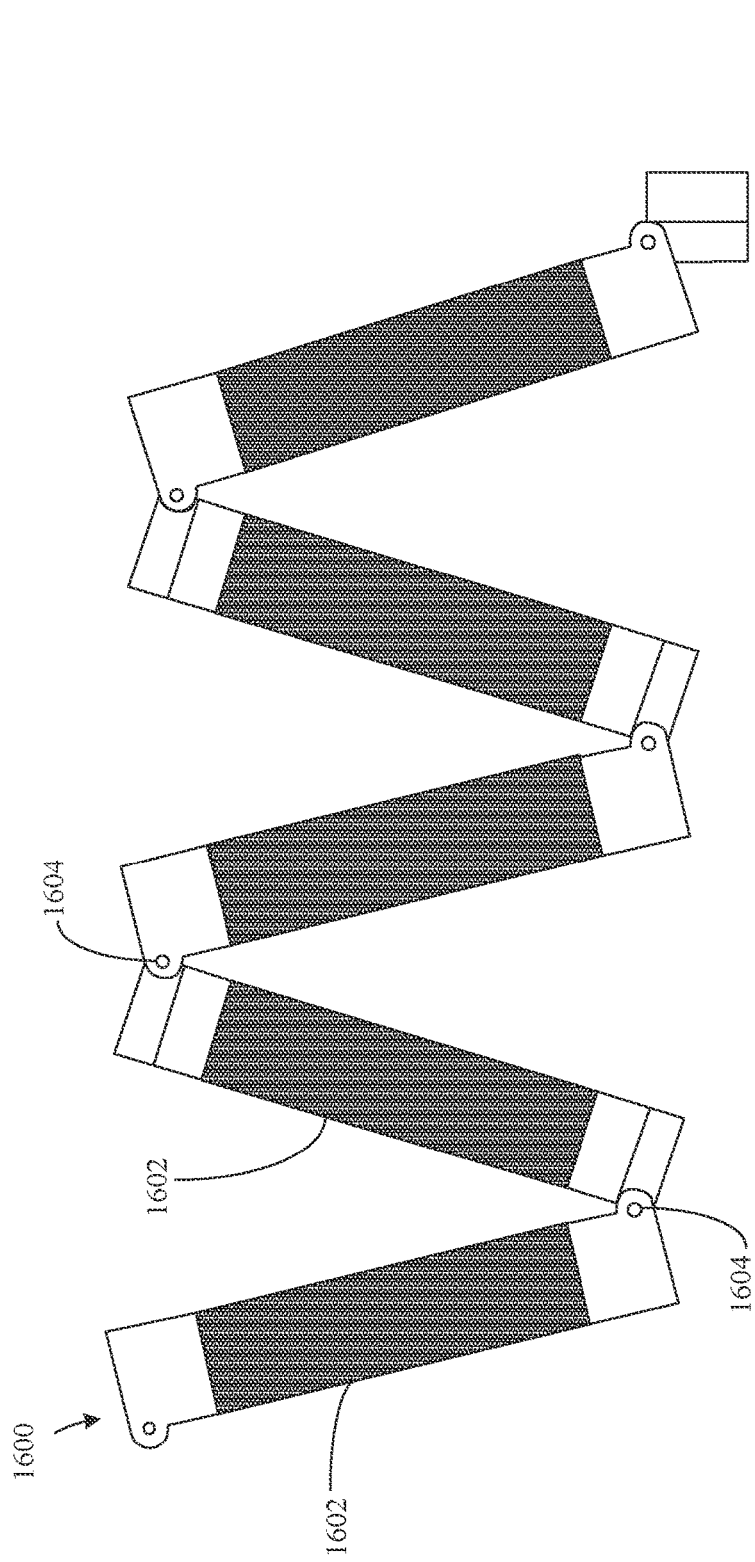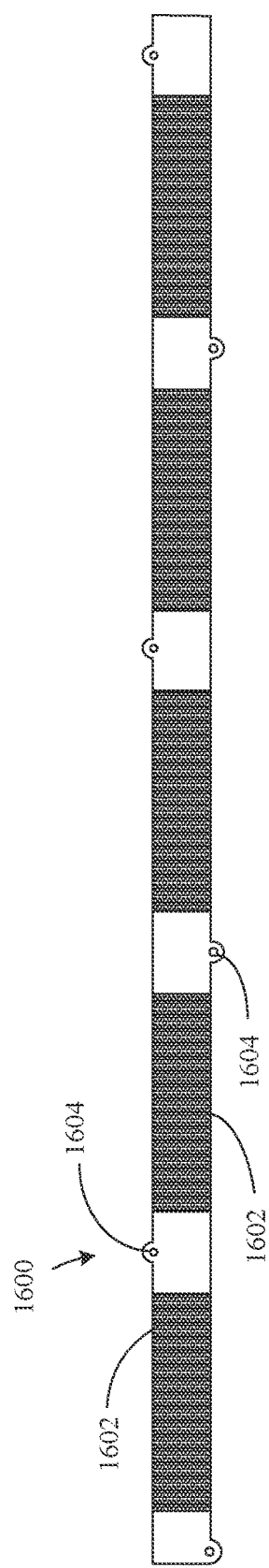
FIG. 16A
FIG. 16B

US 11,780,556 B2

METHODS AND APPARATUS FOR SPACE-EFFICIENT AIRCRAFT DEPLOYMENT

FIELD OF THE DISCLOSURE

This disclosure relates generally to aircraft deployment and, more particularly, to space-efficient aircraft deployment.

BACKGROUND

Deployable aircraft are typically launched from ground or mid-air launch positions to deliver a payload. In particular, some deployable aircraft can carry a payload at significant altitudes while maintaining controlled flight, despite relatively large wind speeds. However, the deployable aircraft can be relatively large to withstand such conditions and, thus, can utilize considerable space in launch vehicles.

SUMMARY

An example method of deploying an aircraft includes separating the aircraft from a launch vehicle, the aircraft having a wing pivotably coupled to a fuselage, rotating, about an axis of rotation, the wing relative to the fuselage from a first rotational orientation to a second rotational orientation different from the first rotational orientation, wherein, in the first rotational orientation, the wing extends along a direction that substantially aligns with a longitudinal axis of the fuselage, and extending the wing in a lateral direction away from the fuselage in the second rotational orientation.

An example assembly includes a fuselage, and a deployable wing pivotably coupled to the fuselage about an axis of rotation, the wing rotatable between a first rotational orientation and a second rotational orientation different from the first rotational orientation, the wing extending along a direction substantially aligned with a longitudinal axis of the fuselage in the first rotational orientation, the wing to be extended in a lateral direction away from the fuselage in the second rotational orientation as the wing is rotated to the second rotational orientation.

An example aircraft deployment assembly includes a fuselage, a deployable wing pivotably coupled to the fuselage about an axis of rotation relative to the fuselage, the wing rotatable between a first rotational orientation and a second rotational orientation different from the first rotational orientation, the wing extending along a direction substantially aligned with a longitudinal axis of the fuselage in the first rotational orientation, the wing to be extended in a lateral direction away from the fuselage in the second rotational orientation as the wing is being deployed, and an outer casing defining a cross-sectional perimeter to enclose the fuselage and the deployable wing with the wing in the first rotational orientation.

BRIEF DESCRIPTION OF THE DRAWINGS

FIGS. 9A-9C illustrate yet another example aircraft in accordance with teachings of this disclosure.

FIGS. 16A and 16B illustrate another example wing portion that can be implemented in examples disclosed herein.

Figure 1:
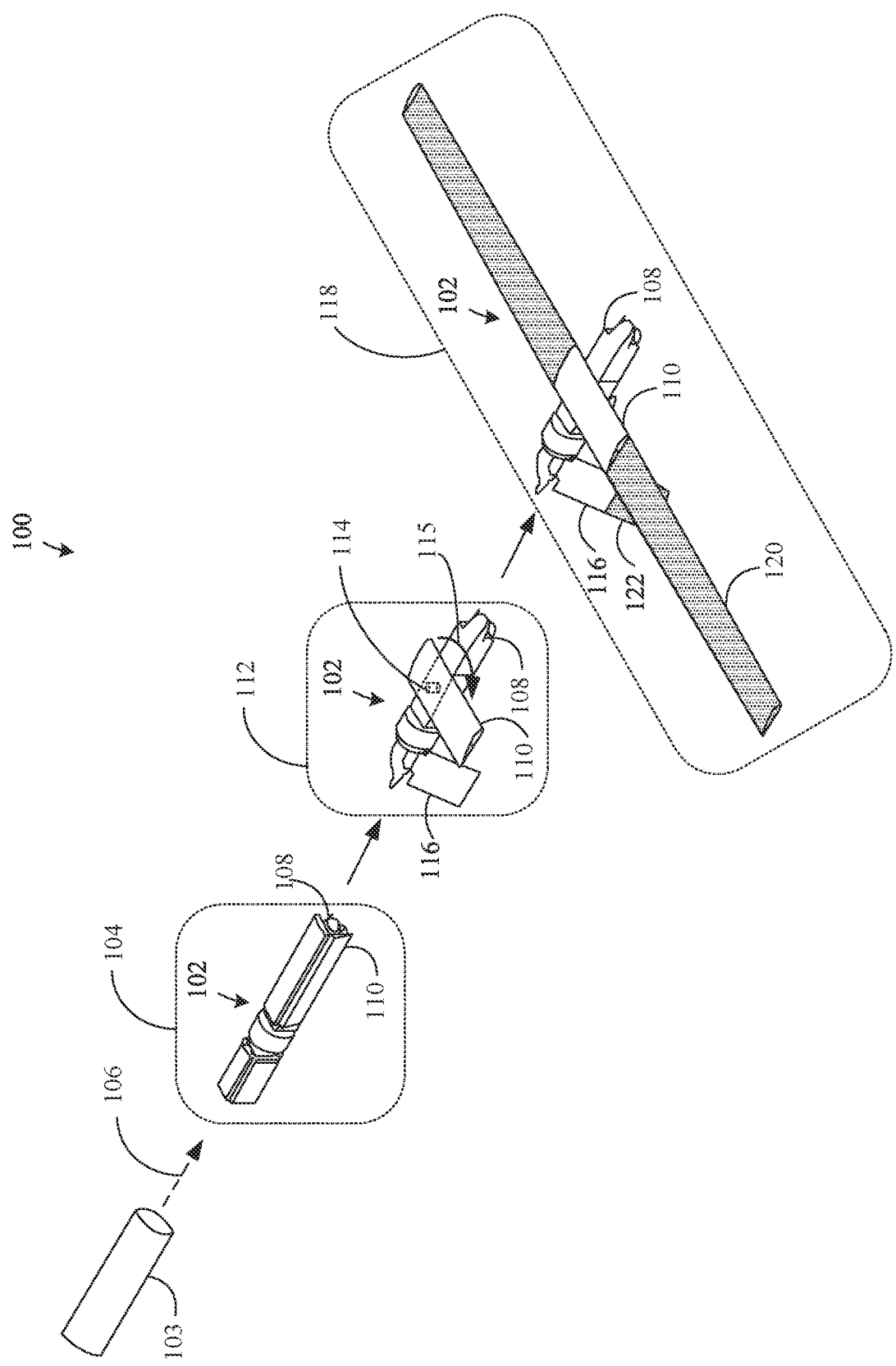
FIG. 1 illustrates an example deployment sequence of an example aircraft in accordance with teachings of this disclosure.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Methods and apparatus for space-efficient aircraft deployment are disclosed. Some known implementations utilize a launch vehicle to deploy an aircraft in the air or near orbital altitudes so that the aircraft can carry or deliver a payload, at and/or through relatively high altitudes, for example. Due to constraints of the aforementioned launch vehicle, the capabilities of the deployed aircraft can be limited. In particular, physical limitations (e.g., payload capacity, weight, volume, wing size, wing shape, etc.) and/or power draw of the launch vehicle may constrain flight capabilities of the deployed aircraft.

Examples disclosed herein implement a space-efficient method to stow and deploy an aircraft to efficiently utilize an internal volume of a corresponding launch vehicle. According to examples disclosed herein, an arrangement and/or a relative positioning of components (e.g., fuselage, wing, payload, etc.) within a cavity (e.g., within a diameter of the cavity) of the launch vehicle enables utilization of smaller and more light weight launch vehicles with enhanced flight capabilities compared to known systems. Examples disclosed herein enable cost-efficient manufacturing and a lower overall weight of the deployed aircraft, thereby enabling significant fuel savings and a longer-duration of sustained flight. Further, examples disclosed herein can utilize folding of an aircraft to fit the aircraft within the tight spatial constraints of the launch vehicle.

Examples disclosed herein implement launch systems (e.g., mid-air launch systems, orbital launch systems, space launch systems, etc.) that can advantageously facilitate space-saving of a launch vehicle. Examples disclosed herein can be stored in a compact volume by including deployable aircraft with foldable wing portions (e.g., rotatable wing portions, inflatable wing portions, etc.). The foldable wing portions can improve maneuverability, reduce overall weight, and improve flight endurance of the deployable aircraft. Further, examples disclosed herein can enable increased payload capacity of the launch vehicle. Moreover, examples disclosed herein can enable relatively quick deployment of the aircraft (e.g., faster rotation of the wing, and/or faster inflation of inflatable wing portions, etc.).

According to examples disclosed herein, an example wing is rotatable between a first rotational orientation (e.g., a retracted or folded position) and a second rotational orientation (e.g., an extended position) with respect to a first axis. According to examples disclosed herein, the wing extends along a direction that is generally aligned with a longitudinal axis of the fuselage in the first rotational orientation.

In some examples, the wing extends in a direction perpendicular to the longitudinal axis in the second rotational orientation. In some examples, the wing includes at least one of a rigid spar or a telescoping spar. In other examples, the wing can include an inflatable wing portion. In some such examples, the inflatable wing portion may include chordwise stitching or spanwise stitching.

As used herein, "chordwise" refers to a direction along a chord of an airfoil section and "spanwise" refers to a direction along a span of the wing. In some examples, the inflatable wing portion may include a coiled wing. For example, the coiled wing may include at least one of a Storable Tubular Extendible Member (STEM) shape, a bi-STEM shape, or a lenticular boom shape that folds out along an axial direction parallel to the wing. In other examples, the wing may include a fiber reinforced flexible membrane.

As used herein, stating that a first object or feature is substantially parallel or aligned with a second object or feature means that the first object is substantially parallel or aligned within 5 degrees of the second object. Similarly, stating that a first object or feature is substantially perpendicular to a second object means that the first and second objects or features are between 85 degrees to 95 degrees from one another.

FIG. 1 illustrates an example deployment sequence (e.g., an unfolding sequence) 100 of an example aircraft 102 in accordance with teachings of this disclosure. The example aircraft 102 is depicted as being unfolded as it is deployed from an example launch vehicle (e.g., an outer casing or housing of a launch vehicle) 103.

At example time 104, the example aircraft 102 is propelled forward from the launch vehicle 103, as generally indicated by an arrow 106. Additionally or alternatively, the example aircraft 102 is ejected rearward from the launch vehicle 103. In some examples, the example launch vehicle 103 (e.g., a shell, a housing or outer casing of the launch vehicle 103) can detach in multiple pieces (e.g., projectile cover halves, casing portions, etc.) to release (e.g., remove) the example aircraft 102 therefrom. In some examples, the example shell outer casing defines a circular perimeter (e.g., cross-sectional perimeter) and/or cross-sectional area to enclose the example aircraft 102. The example aircraft 102 is depicted at time 104 in FIG. 1 in a folded state and has a fuselage 108 and a wing 110, with the wing 110 extending in a direction that is substantially parallel (e.g., within 5 degrees) to a longitudinal axis of the fuselage 108.

At example time 112, the example aircraft 102 is depicted in an unfolded state such that the wing 110 is unfolded from the fuselage 108 by being rotated about the pivot 114 along a direction generally indicated by an arrow 115. In this example, the wing 110 extends along a direction that is substantially perpendicular (e.g., within 5 degrees) to the fuselage 108. Additionally or alternatively, at time 112, a tail wing assembly 116 is also unfolded with respect to the fuselage 108.

At time 118, the example aircraft 102 is depicted in a fully expanded (e.g., fully unfolded) state with an expandable (e.g., foldable) wing portion 120 extending outward from the wing 110. In this example, the expandable wing portion 120 is extended laterally relative to the fuselage 108. Additionally or alternatively, an expandable tail wing portion 122 is unfolded (e.g., extended outward) from the tail wing assembly 116.

Figure 2B:
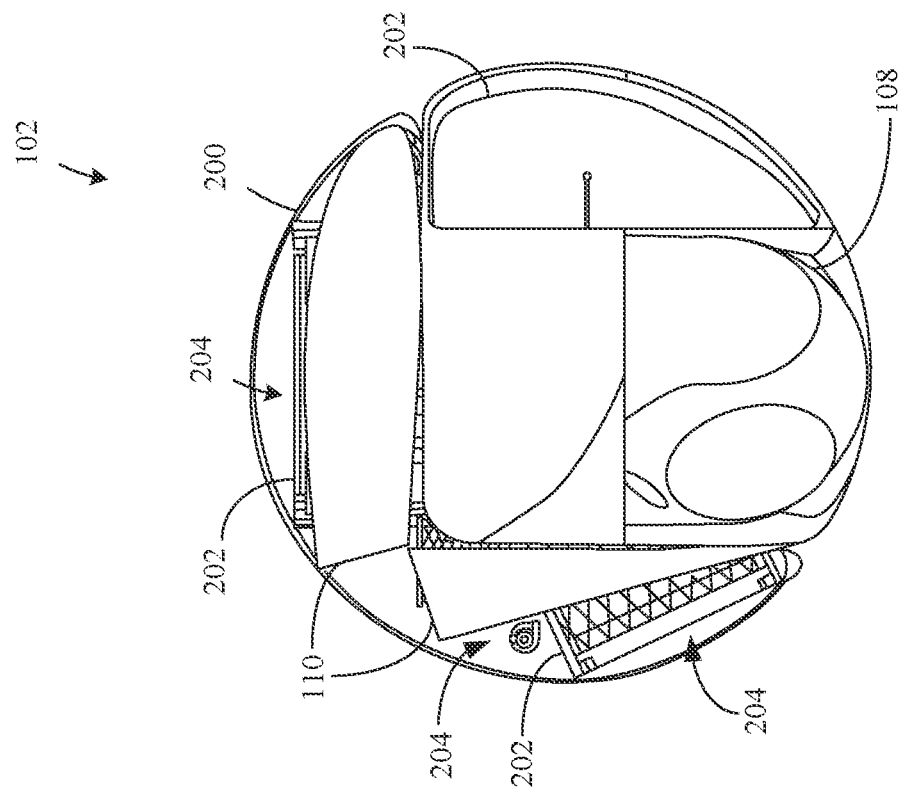
FIGS. 2A-3B are detailed views of the example aircraft of FIG. 1.
Figure 2A:
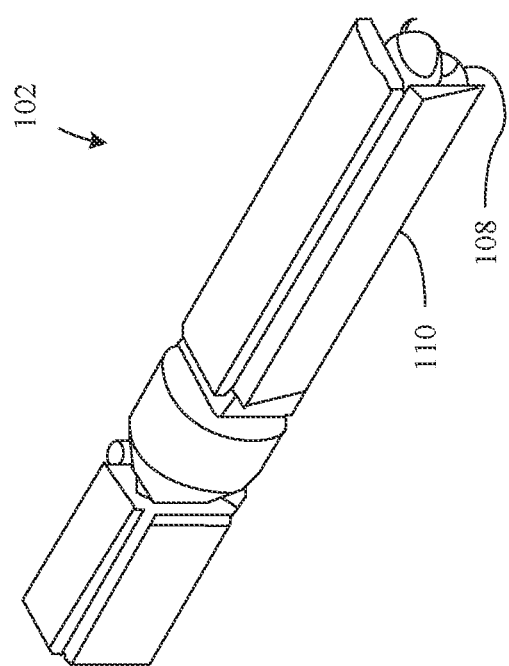

FIGS. 2A-3B are detailed views of the example aircraft 102 of FIG. 1. Turning to FIG. 2A, the example aircraft 102 is depicted in a folded state. The example aircraft 102 includes the wing 110 and the fuselage 108 with the wing 110 extending in a direction that is substantially parallel to the fuselage 108. In some examples, at least a portion (e.g., a distal portion) of the wing 110 contacts the fuselage 108 in the folded state.

FIG. 2B is a front view of the example aircraft 102 of FIG. 2A. In particular, the example aircraft 102 is shown in a folded state with the wing 110 in contact with the fuselage 108. An example perimeter 200 illustrates a cross-sectional representation of the aircraft 102 in the folded state. The perimeter 200 surrounds (e.g., partially surrounds, fully surrounds, encloses) the fuselage 108, the wing 110, components 202 of the aircraft 102, and a cavity (e.g., void) 204. In the illustrated example of FIG. 2B, the cavity 204 is shown as multiple voids or spaces between the perimeter 200 and the aircraft 102. The perimeter 200 (e.g., a diameter of the perimeter 200) can vary based on the size, configuration, design, and shape of the wing 110, the fuselage 108, the components 202, and the cavity 204. In some examples, the size of the perimeter 200 can determine spatial constraints of a launch vehicle, for example.

Figure 3A:
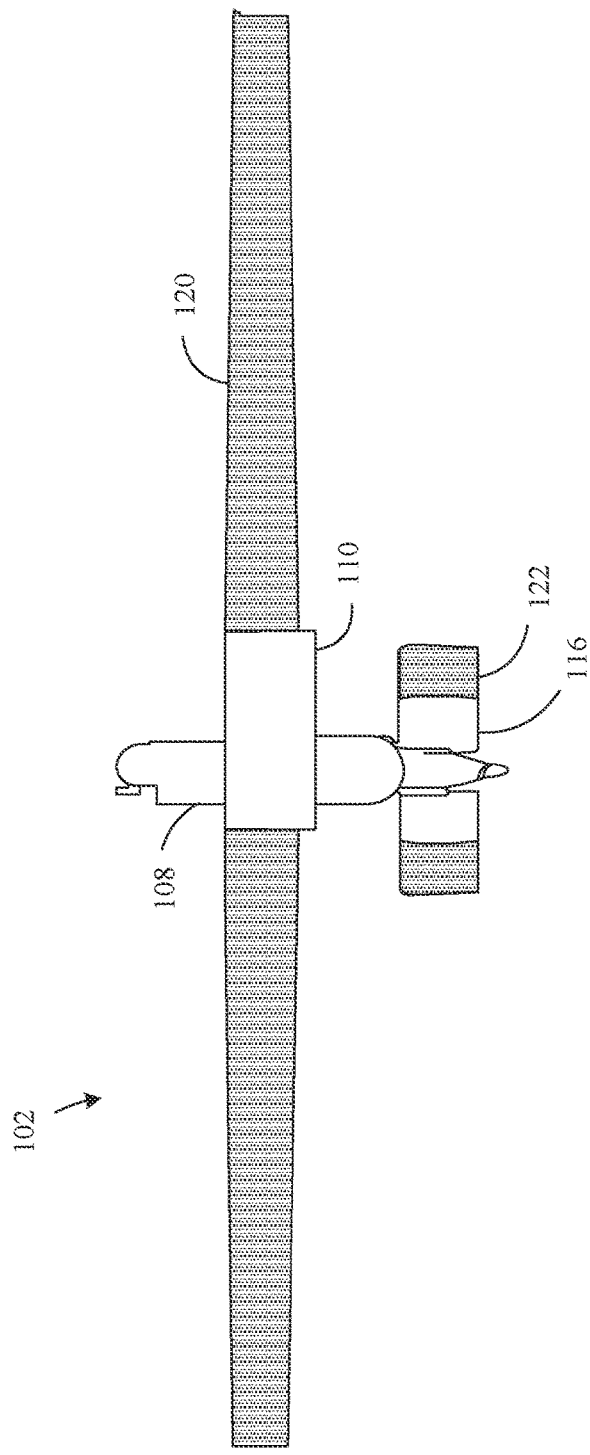
Figure 3B:
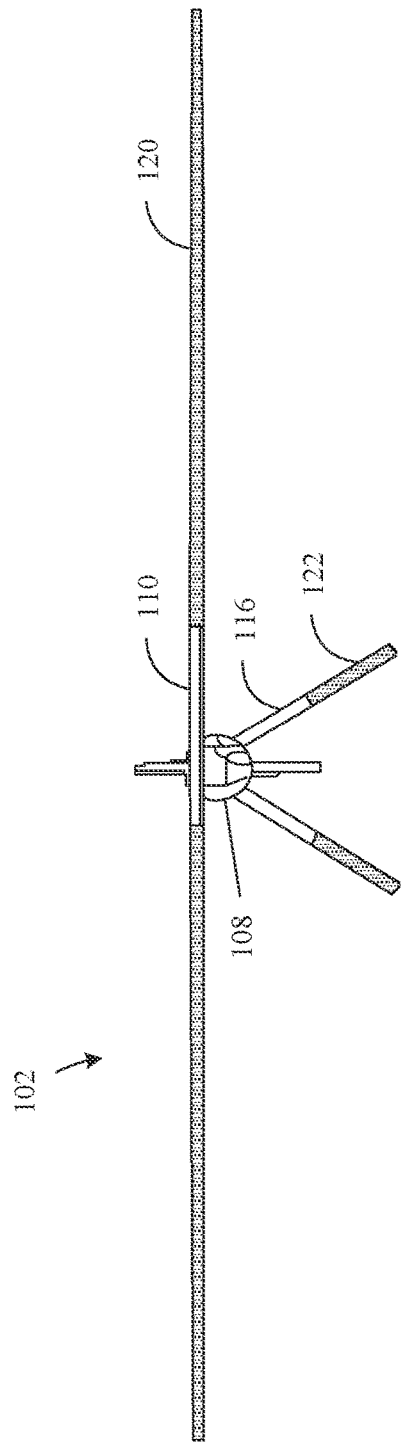

FIGS. 3A and 3B illustrate the example aircraft 102 in an unfolded state (e.g., expanded state). FIG. 3A is an overhead or a plan view of the example aircraft 102 while FIG. 3B is a front view of the example aircraft 102. In the example of FIGS. 3A and 3B, the expandable wing portion 120 is extended outward from the wing 110 (e.g., fully deployed state) in a lateral direction from the fuselage 108. Further, in this example, the expandable tail wing portion 122 is extended outward from the tail wing assembly 116.

Figure 5:
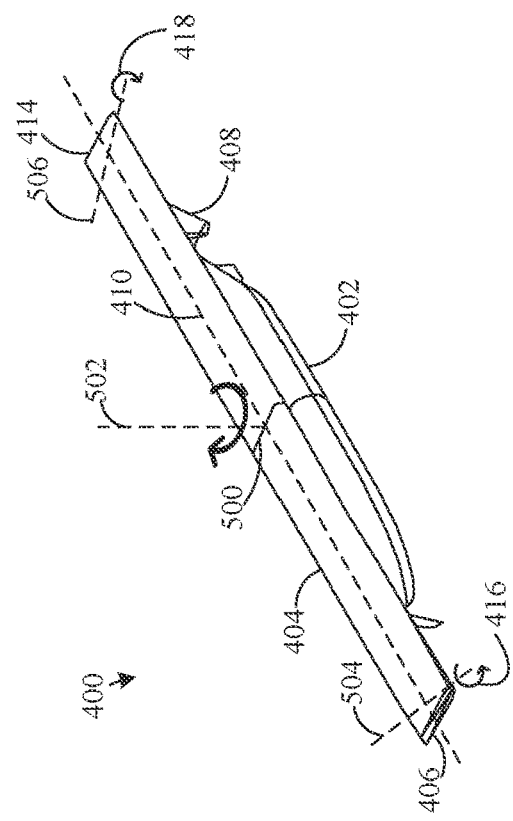
FIGS. 4-6 illustrate another example aircraft in accordance with teachings of this disclosure.
Figure 4:
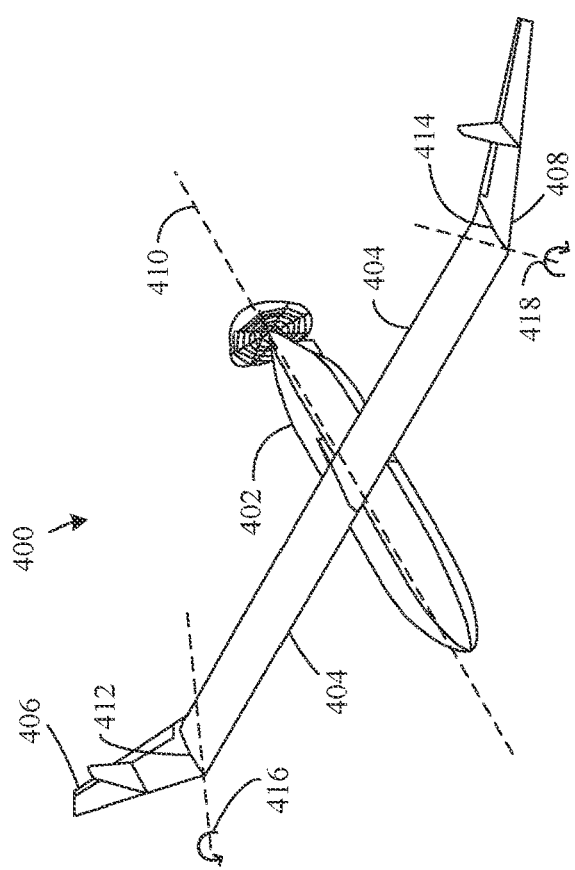

FIGS. 4 and 5 illustrate an example aircraft 400 in accordance with teachings of this disclosure. Turning to FIG. 4, the example aircraft 400 is depicted in a deployed position (e.g., deployed state) and includes a fuselage 402, and wings 404 which, in turn, includes wing tip portions 406 and 408 on opposed lateral ends of the aircraft 400. In the illustrated example of FIG. 4, each of the wings 404 extends along a direction substantially perpendicular to a longitudinal axis 410 of the fuselage 402. Further, the wing tip portions 406 and 408 fold with respect to their respective wings 404 at corresponding hinges 412 and 414, as generally indicated by arrows 416, 418, respectively. The example wing tip portions 406 and 408 can include a stabilizer or a winglet disposed on or proximate distal ends of the wing tip portions 406 and 408. In this example, the wing 404 is deployed at a rotational orientation that is substantially perpendicular to the longitudinal axis 410. However, the wing 404 can be oriented at any appropriate rotational orientation relative to the longitudinal axis 410 of the fuselage 402.

FIG. 5 illustrates the example aircraft 400 in a folded state with the wing 404 at an orientation substantially parallel to the longitudinal axis 410 of the fuselage 402. The wing 404 extends along a direction that aligns with the longitudinal axis 410 of the fuselage 402, for example. In the example of FIG. 5, a pivot 500 is positioned on the longitudinal axis 410 of the fuselage 402. However, in other examples, the pivot 500 can be disposed on a forward portion or section of the fuselage 402, an aft portion of the fuselage 402, or any suitable location on the fuselage 402. In this example, the wing 404 is rotatably coupled to the fuselage at the pivot 500. The example wing 404 can rotate about an axis 502 corresponding to the pivot 500. Additionally or alternatively, the example wing 404 can contact a top surface of the fuselage 402 in the folded state.

In the example depicted in FIG. 5, the wing tip portions 406 and 408 fold about hinge axes 504 and 506. For example, the wing tip portions 406 and 408 fold inward toward the fuselage 402 along directions generally indicated by the arrows 416, 418, respectively. In some examples, the wing tip portions 406 and 408 are to contact a bottom surface of the wing 404 when the wing tip portions 406 and 408 are unfolded and/or deployed. However, additionally or alternatively, the wing tip portions 406 and 408 can fold to contact a top surface of the corresponding wing 404.

Figure 6:
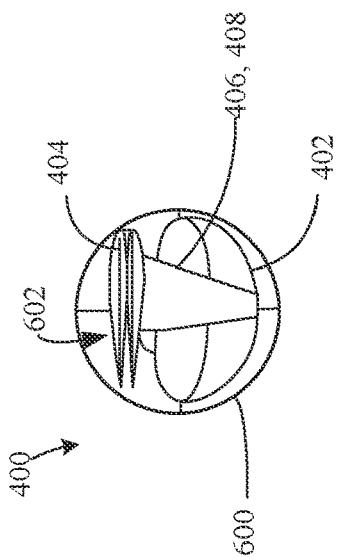

FIG. 6 is a front view of the example aircraft 400 of FIG. 5. An example perimeter 600 illustrates a cross-sectional representation of the aircraft 400 in the folded state. The perimeter 600 surrounds (e.g., partially surrounds, fully surrounds, encloses) the fuselage 402, the wing 404, the wing tip portions 406 and 408, and a cavity 602. In the illustrated example of FIG. 7, the cavity 602 is shown as a space between the perimeter 600 and the aircraft 400. A diameter of the perimeter 600 may vary based on the size, configuration, design, and shape of the wing 404, the wing tip portions 406 and 408, and the fuselage 402. The perimeter 600 is shown in FIG. 6 to emphasize the stowed position of the example aircraft 400.

The example aircraft 400 shown in FIGS. 4-6, is configured as a rigid wing configuration. However, in other examples, the example aircraft 400, the wing 404 or the wing tip portions 406 and 408 can include any combination of rigid wing, expandable and/or inflatable wing configurations.

Figure 7:
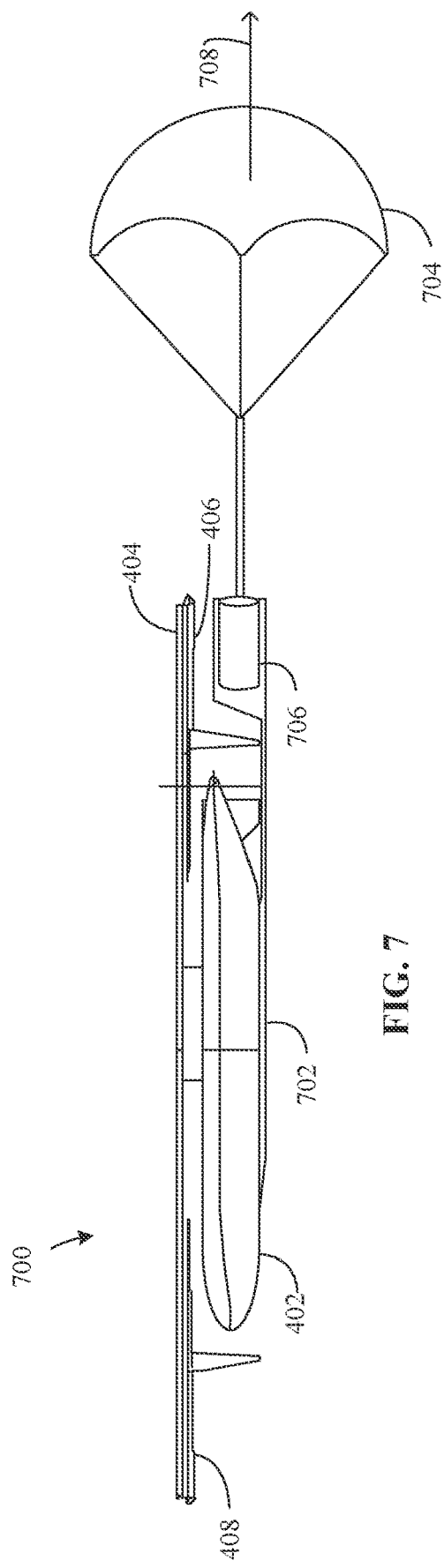
FIGS. 7 and 8 illustrate another example aircraft in accordance with teachings of this disclosure.
Figure 8:
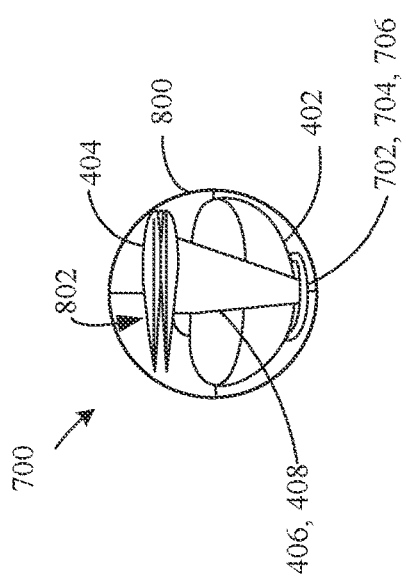

FIGS. 7 and 8 illustrate an example aircraft 700 that can be implemented in examples disclosed herein. FIG. 7 is a side view of the example aircraft 700. The example aircraft 700 of FIGS. 7 and 8 is similar to the example aircraft 400 of FIGS. 4-6 but, instead, includes a channel 702 to store a chute 704. In the example of FIG. 7, the aircraft 700 is depicted in a folded state with the wing 404 at an orientation substantially parallel to the fuselage 402. In particular, the wing tip portions 406 and 408 are folded inwards toward the fuselage 402 to contact a bottom surface of the wing 404. In this example, the chute 704 is stored in a housing 706 and is deployed in a direction generally indicated by an arrow 708 that opposes the direction of movement of the example aircraft 700.

FIG. 8 is a front view of the example aircraft 700. An example area or perimeter 800 illustrates a cross-sectional space and/or area of the aircraft 700 that may or may not be defined by physical features and/or components. The perimeter 800 surrounds (e.g., partially surrounds, fully surrounds, encloses) the fuselage 402, the wing 404, the wing tip portions 406 and 408, the chute 704, the channel 702, the housing 706, and a cavity 802. The perimeter 800 is illustrated in FIG. 8 depicts a stowed position of the example aircraft 700 and a stowed position of the chute 704.

Figure 9B:
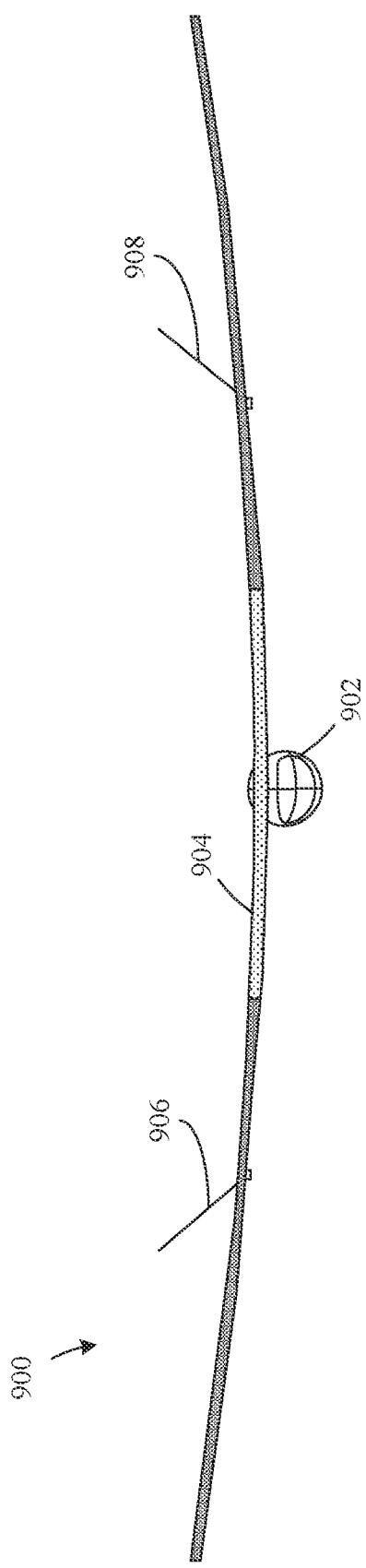
Figure 9C:
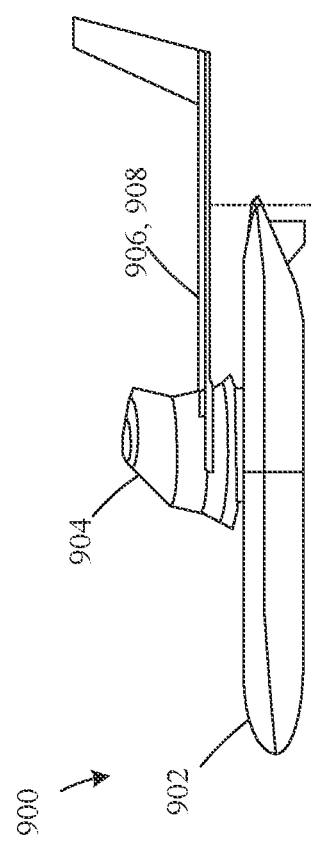

FIGS. 9A-9C illustrate an example aircraft 900 that can be implemented in examples disclosed herein. Turning to FIG. 9A, the example aircraft 900 is depicted in a deployed position. The example aircraft 900 includes a fuselage 902, and a wing 904 with wing booms 906 and 908. The wing booms 906 and 908 can include a stabilizer or a winglet disposed on or proximate distal ends of the wing booms 906 and 908. The example aircraft 900 is depicted with the wing 904 deployed at a rotational orientation in which the wing 904 extends generally perpendicular to the fuselage 902. However, the wing 904 can be oriented at any rotational orientation nonparallel to a longitudinal axis 910 of the fuselage 902. In this example, the wing 904 is rotatably coupled to the fuselage 902 such that the wing 904 rotates along a direction generally indicated by an arrow 912. Further, in the example illustrated in FIG. 9, the wing 904 can include a rigid portion 914 and an inflatable portion 916. Additionally or alternatively, wing booms 906 and 908 can have corresponding rigid portions 918, 920, as well as respective inflatable portions 922, 924 respectively. The example portions 918, 920 can define tail booms while the inflatable portions 922, 924 can define stabilizers and/or fairings, for example.

FIG. 9B is a front view of the example aircraft 900 and FIG. 9C is a side view of the example aircraft 900. In the illustrated examples of FIGS. 9B and 9C, the wings 904 include the wing booms 906, 908 and extend in a direction generally perpendicular (e.g., within 5 degrees) to the fuselage 902.

Figure 10:
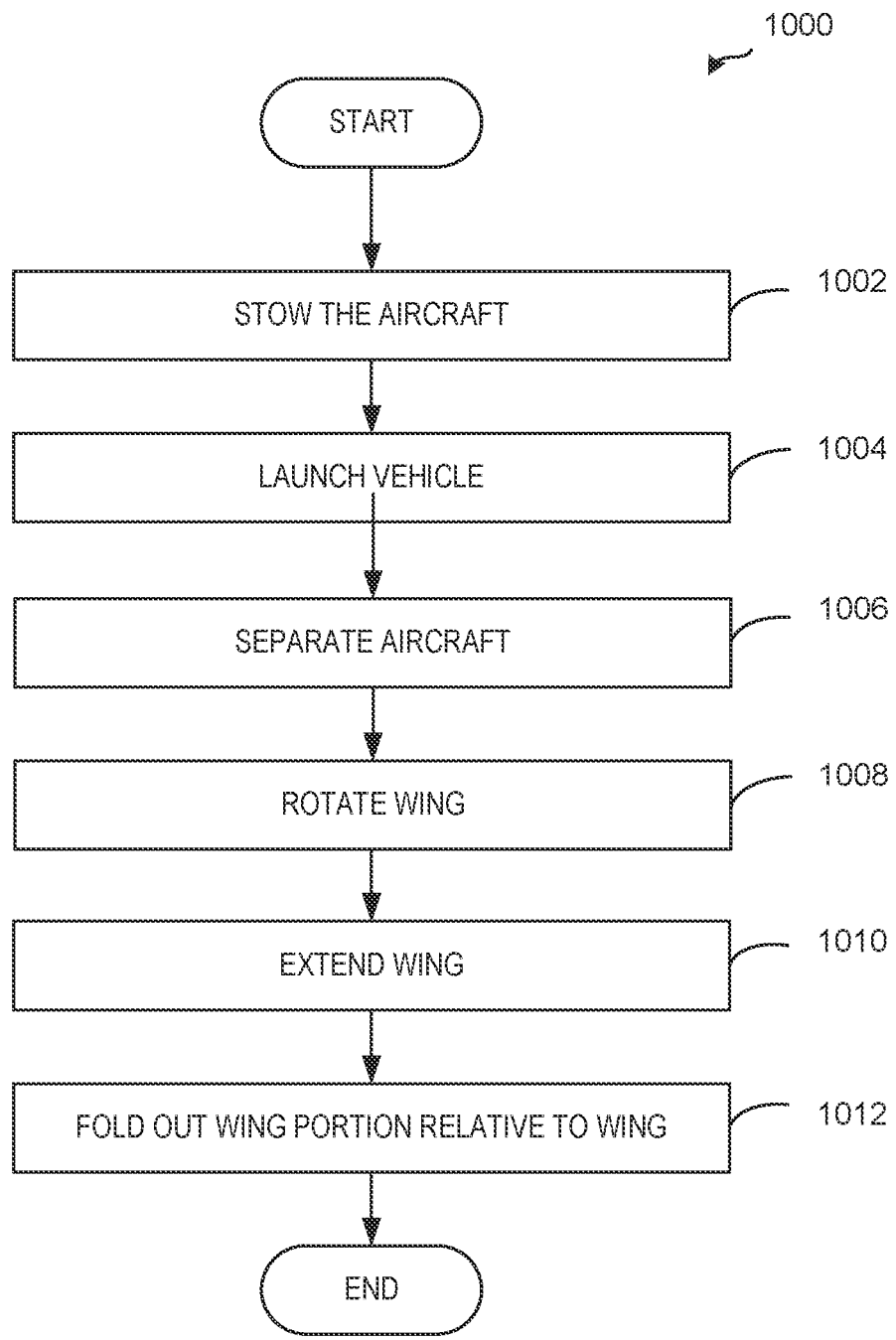
FIG. 10 is a flowchart representative of an example method to implement examples disclosed herein.

FIG. 10 is a flowchart representative of an example method 1000 to implement examples disclosed herein. The example method 1000 can be executed to deploy an example aircraft (e.g., the example aircraft 102 of FIG. 1, the example aircraft 400 of FIGS. 4-6, and/or the example aircraft 700 of FIGS. 7 and 8).

The example method 1000 of FIG. 10 begins at block 1002, at which an example aircraft 102 is stowed (e.g., folded) in an example launch vehicle 103.

At block 1004, the example launch vehicle 103 is launched.

At block 1006, the example aircraft 102 is separated and/or deployed from the launch vehicle 103. In particular, the example aircraft 102 can be launched in forward or rearward directions from the launch vehicle 103. In this example, the aircraft is deployed with the wing 110 in a folded position. However, in other examples, the wing 110 can be deployed in a partially unfolded position.

At block 1008, the wing 110 is rotated about a pivot 114. Additionally or alternatively, the tail wing assembly 116 is rotated with respect to the fuselage 108. In other examples, the wing 110 is rotated from a first position parallel to a centerline of the fuselage 108 to a second position nonparallel to the centerline of the fuselage 108.

At block 1010, the expandable wing portion 120 is extended out with respect to the fuselage 108. In other examples, the expandable tail wing portion 122 is extended out with respect to the fuselage 108. In other examples, the expandable wing portion 120 and the expandable tail wing portion 122 are extended out simultaneously with respect to the fuselage 108.

At block 1012, the expandable wing portion 120 is folded out relative to the wing 110. In some examples, the expandable wing portion 120 is deployed via an inflation of the expandable wing portion 120. In some examples, the expandable tail wing portion 122 is folded out relative to the tail wing assembly 116. In other examples, the expandable wing portion 120 can include a rigid spar or a telescoping spar.

Figure 11A:
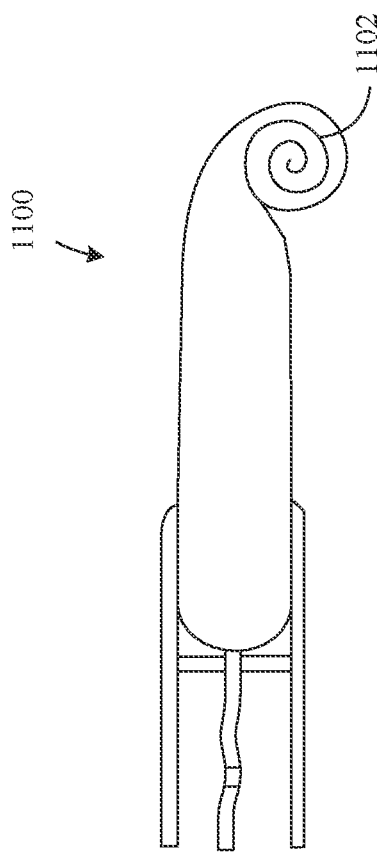
FIGS. 11A-12C illustrate example inflatable wing portions that can be implemented in examples disclosed herein.
Figure 11B:
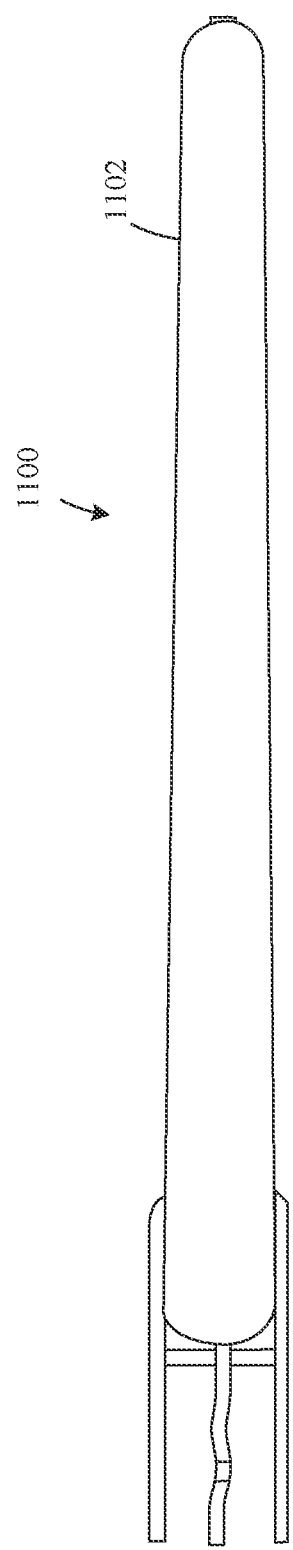

FIGS. 11A-11B illustrate an example inflatable wing portion 1100 that can be implemented in examples disclosed herein. Turning to FIG. 11A, the example inflatable wing portion 1100 is depicted in a folded state with a distal end 1102 coiled (e.g., rolled) inwards. Turning to FIG. 11B, the example inflatable wing portion 1100 is depicted in an unfolded state (e.g., deployed position, inflated state, etc.) with the distal end 1102 coiled outwards.

Figure 12C:
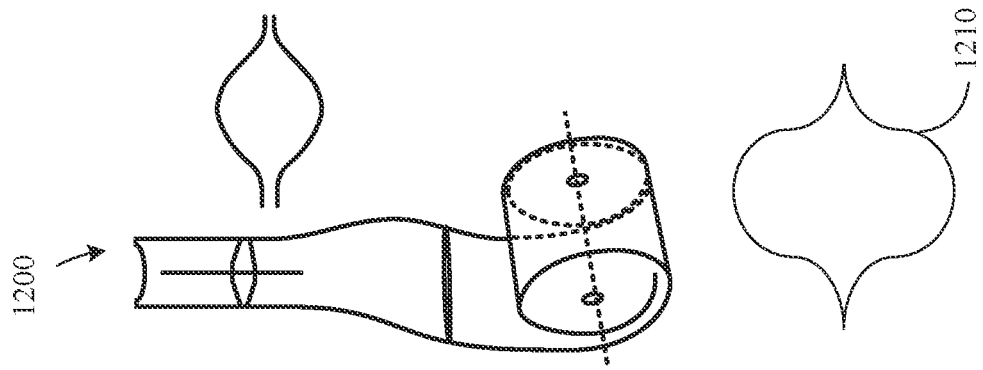
Figure 12B:
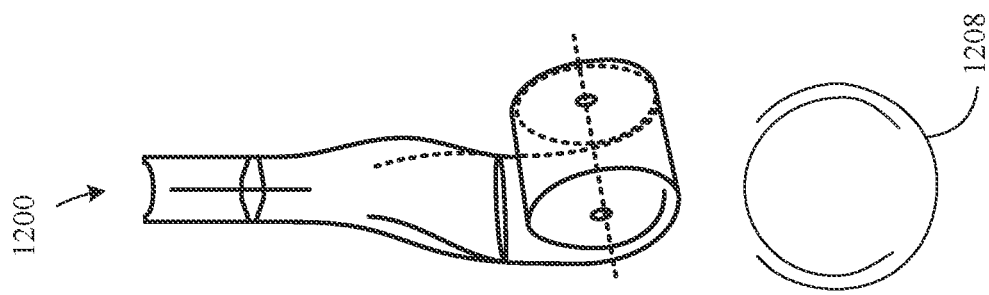
Figure 12A:
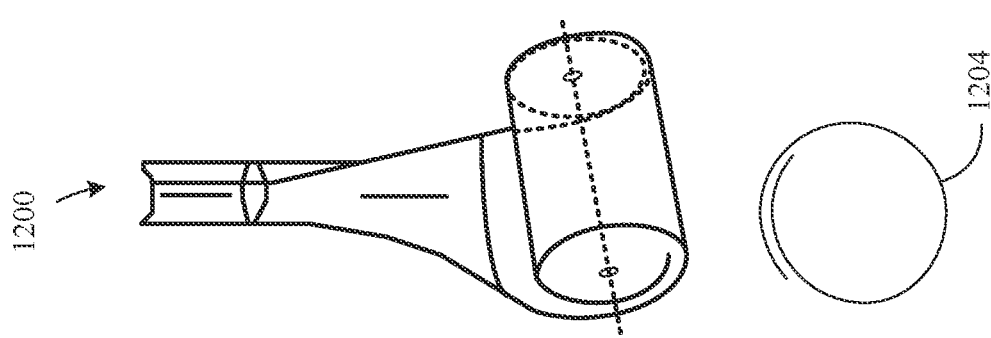

FIGS. 12A-12C illustrate an example inflatable wrapped wing portion 1200 that can be implemented in examples disclosed herein. In the examples depicted in FIGS. 12A-12C, the wing portion 1200 extends via an inflation of the wing portion 1200. Turning to FIG. 12A, the example wrapped wing portion 1200 has a cross-sectional shape 1204 (e.g., a STEM shape). In the example of FIG. 12B, the wrapped wing portion 1200 has a cross-sectional shape 1208 (e.g., a bi-STEM shape). Turning to FIG. 12C, the example wrapped wing portion 1200 has a cross-sectional shape 1210 (e.g., a lenticular shape).

Figure 13:
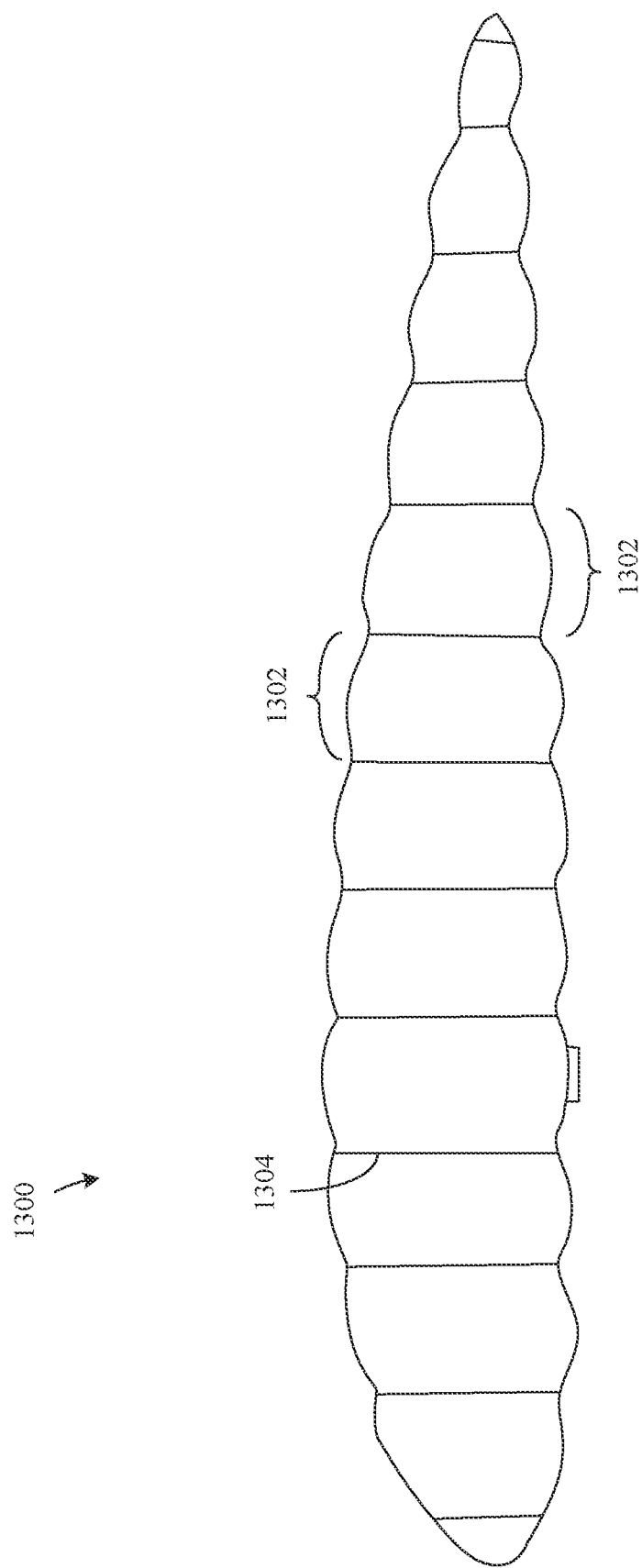
FIGS. 13-14 illustrate example airfoils that can be implemented in examples disclosed herein.

FIG. 13 illustrates an example airfoil 1300 that can be implemented in examples disclosed herein. The example airfoil 1300 includes inflatable portions 1302 that extend spanwise from a fuselage. In this example, stitching 1304 attaches the inflatable portions 1302 together such that the airfoil 1300 is at least partially inflatable. In the example depicted in FIG. 13, the stitching 1304 and the inflatable portions 1302 extend spanwise along the airfoil 1300. Additionally or alternatively, the stitching 1304 and the inflatable portions 1302 can extend chordwise along an example wing.

Figure 14:
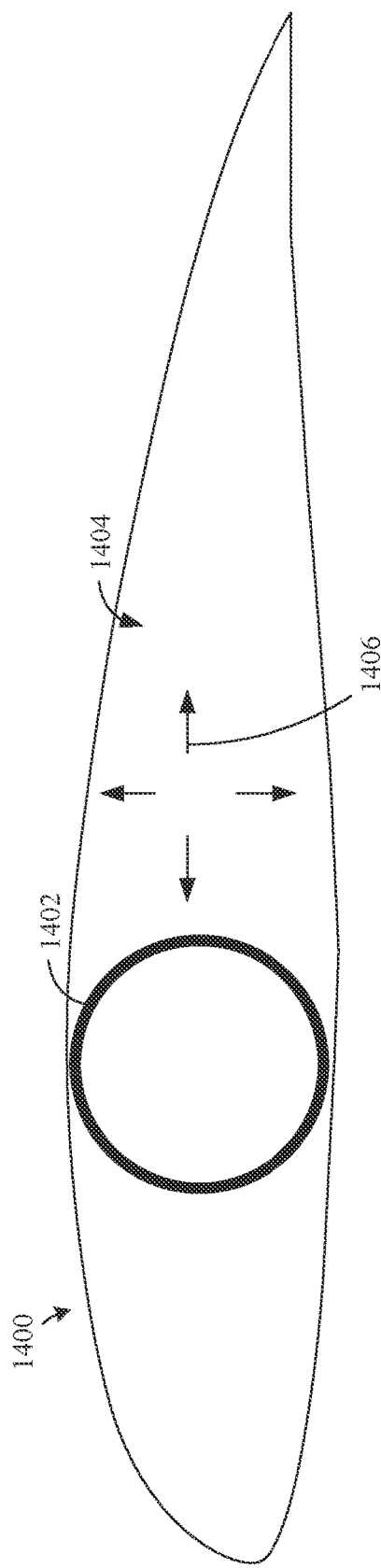

FIG. 14 illustrates an example airfoil 1400 that can be implemented in examples disclosed herein. The example airfoil 1400 has a rigid spar 1402 and an inflatable portion 1404. The inflatable portion 1404 inflates or extends out from the rigid spar 1402 in a direction generally indicated by arrows 1406. In some examples, the rigid spar 1402 is at least one of a telescoping spar or an accordion spar (further detail in FIGS. 15A-16B). In some examples, the spar 1402 is segmented and extends out from a fuselage in response to an inflation of the inflatable portion 1404.

Figure 15A:
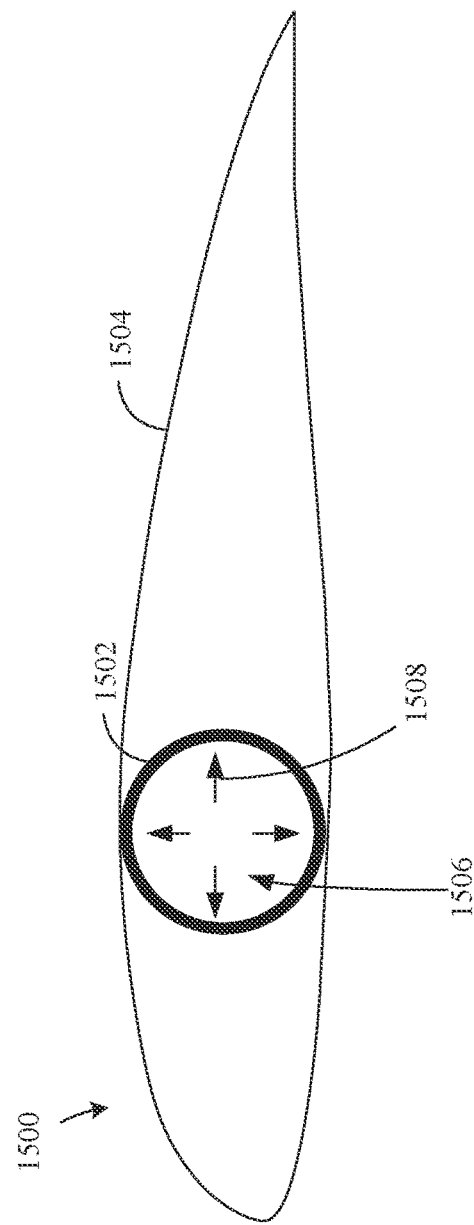
FIGS. 15A and 15B illustrate an example wing portion that can be implemented in examples disclosed herein.
Figure 15B:
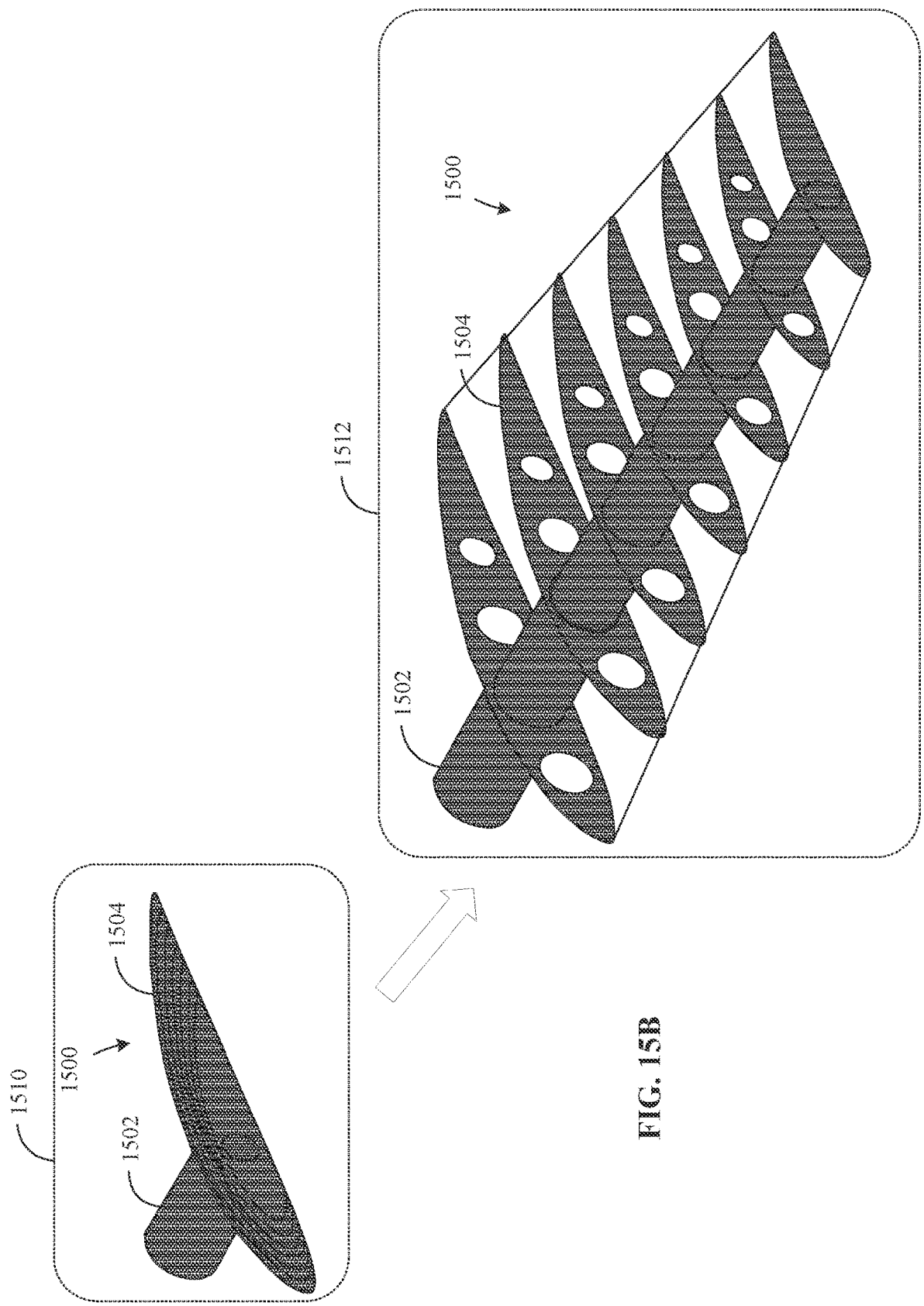

FIGS. 15A and 15B illustrate an example expandable wing portion 1500 that can be implemented in examples disclosed herein. Turning to FIG. 15A, the example wing portion 1500 has an expandable spar 1502 and expandable ribs 1504 that define an airfoil of the wing portion 1500. The example expandable spar 1502 extends in an axial direction of the wing portion 1500. In this example as depicted in FIG. 15A, the expandable wing portion 1500 has an inflatable portion 1506 that inflates in a direction generally indicated by arrows 1508.

Turning to FIG. 15B, at time 1510, the example expandable wing portion 1500 is depicted in a folded state, with the ribs 1504 and the spar 1502 retracted. At time 1512, the example expandable wing portion 1500 is depicted in an unfolded state (e.g., deployed position) with the spar 1502 and the ribs 1504 extended. In some examples, at least one of the expandable spar 1502 or the ribs 1504 is extended in response to an inflation of the spar 1502.

FIGS. 16A and 16B illustrate an example accordion spar 1600 that can be implemented in examples disclosed herein. Turning to FIG. 16A, the example accordion spar 1600 includes segments 1602 that connect via pins 1604. In the view of FIG. 16A, the example accordion spar 1600 is depicted in a folded state (e.g., retracted), with the segments 1602 oriented nonlinearly. Turning to FIG. 16B, the example accordion spar 1600 is depicted in an unfolded state (e.g., extended or deployed position) with the segments 1602 rotated about the pins 1604.

Figure 17:
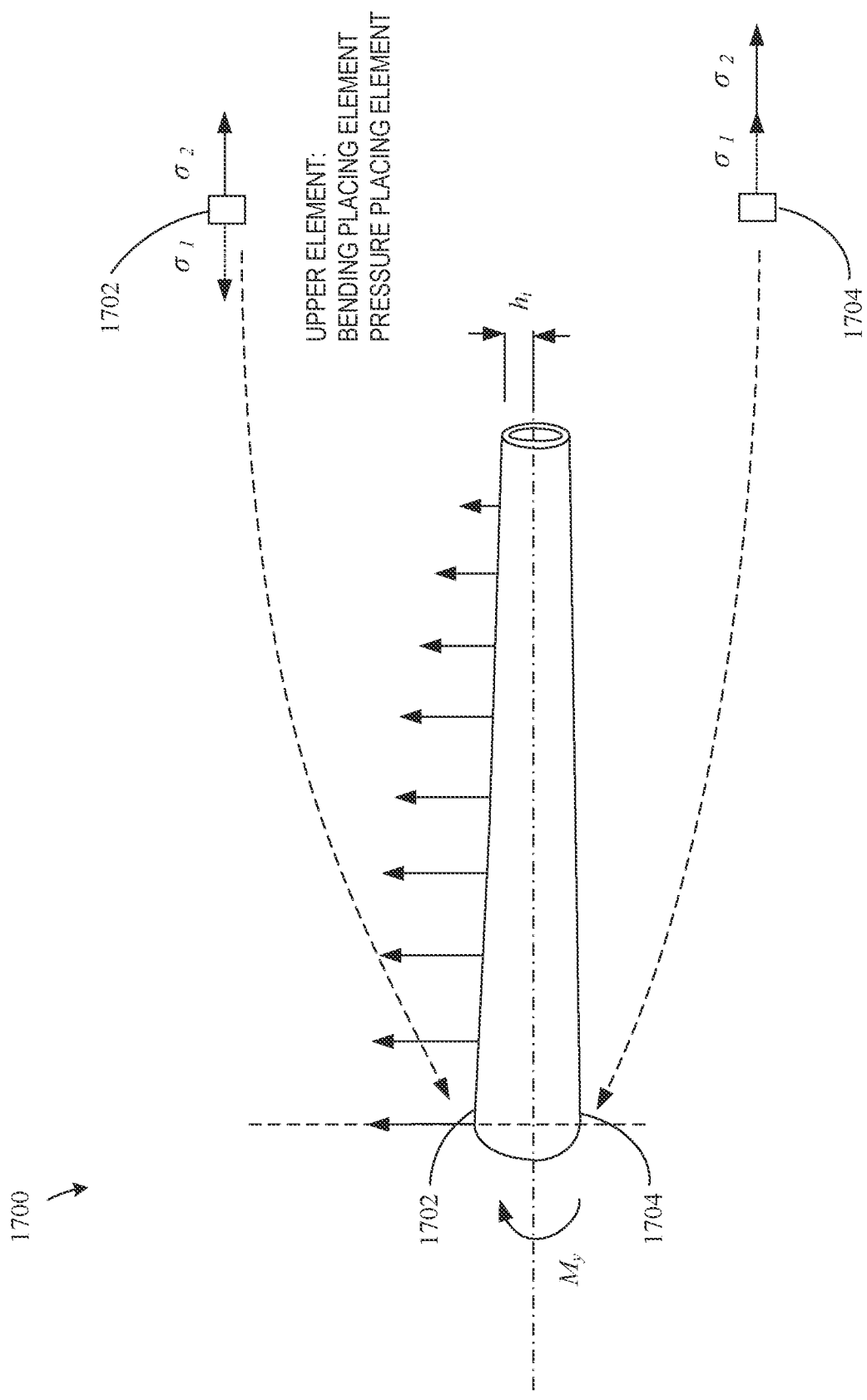
FIG. 17 illustrates an example wing design methodology that can be implemented with examples disclosed herein.

FIG. 17 illustrates an example wing design methodology 1700 to implement examples disclosed herein. The example wing design methodology 1700 utilizes calculations of stress on the upper and lower elements 1702 and 1704 to determine a wing structure. For example, the internal pressure of a wing must be relatively high to prevent failure (e.g., buckling, ripping, etc.) of the wing (e.g., wing material, wing spar, etc.).

From the foregoing, it will be appreciated that example systems, methods, apparatus, and articles of manufacture have been disclosed that efficiently utilize the spatial constraints of a launch vehicle, thereby saving space and weight of the launch vehicle. In particular, an arrangement and/or a relative positioning of components (e.g., fuselage, wing, payload, etc.) within a diameter of the launch vehicle advantageously utilizes space of the launch vehicle. Examples disclosed herein can enable cost-efficient manufacturing and a lower overall weight of the stowed aircraft. Accordingly, examples disclosed herein can enable increased payload capacity of the aircraft and/or the launch vehicle.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent. The following claims are hereby incorporated into this Detailed Description by this reference, with each claim standing on its own as a separate embodiment of the present disclosure.

Example 1 includes a method of deploying an aircraft, the method comprising separating the aircraft from a launch vehicle, the aircraft having a wing pivotably coupled to a fuselage, rotating, about an axis of rotation, the wing relative to the fuselage from a first rotational orientation to a second rotational orientation different from the first rotational orientation, wherein, in the first rotational orientation, the wing extends along a direction that substantially aligns with a longitudinal axis of the fuselage, and extending the wing in a lateral direction away from the fuselage in the second rotational orientation.

Example 2 includes the method of example 1, wherein the axis of rotation is a first axis of rotation, and further including rotating a wing portion relative to the wing about a second axis of rotation.

Example 3 includes the method of example 1, wherein the wing extends in a direction substantially perpendicular to the longitudinal axis in the second rotational orientation.

Example 4 includes the method of example 1, further including stowing the aircraft in the launch vehicle when the wing is in the first rotational orientation, and launching the launch vehicle.

Example 5 includes the method of example 4, further including rotating the wing to the first rotational orientation prior to stowing the aircraft.

Example 6 includes the method of example 4, wherein the fuselage of the stowed aircraft includes a channel to store a chute, the chute deployable when the wing is in at least one of the first rotational orientation or the second rotational orientation.

Example 7 includes an assembly for use with an aircraft, the assembly comprising a fuselage, and a deployable wing pivotably coupled to the fuselage about an axis of rotation, the wing rotatable between a first rotational orientation and a second rotational orientation different from the first rotational orientation, the wing extending along a direction substantially aligned with a longitudinal axis of the fuselage in the first rotational orientation, the wing to be extended in a lateral direction away from the fuselage in the second rotational orientation as the wing is rotated to the second rotational orientation.

Example 8 includes the assembly of example 7, wherein the axis of rotation is a first axis of rotation, and further including a wing portion pivotably coupled to the wing about a second axis of rotation.

Example 9 includes the assembly of example 8, wherein the second axis of rotation is substantially parallel to the longitudinal axis of the fuselage when the wing is rotated to the second rotational orientation.

Example 10 includes the assembly of example 8, wherein the first rotational orientation is a stowed position in which the first wing portion is folded to contact the fuselage.

Example 11 includes the assembly of example 8, wherein the second rotational orientation is a deployed position in which the first wing portion is rotated away from the fuselage.

Example 12 includes the assembly of example 8, wherein the wing portion is a first wing portion, and further including second and third wing portions, the second wing portion pivotably coupled to the first wing portion wherein the second and third wing portions at least partially define a second deployable wing of the aircraft.

Example 13 includes the assembly of example 7, wherein the wing extends substantially perpendicular to the longitudinal axis in the second rotational orientation.

Example 14 includes the assembly of example 7, wherein the wing is at least one of a rigid spar or a telescoping spar.

Example 15 includes the assembly of example 7, wherein the wing includes an inflatable wing portion.

Example 16 includes the assembly of example 7, further including a channel of the fuselage to store a chute.

Example 17 includes the assembly of example 9, further including a pivot point to pivotally couple the wing to the fuselage, the pivot point positioned at least one of symmetrically or asymmetrically on the wing.

Example 18 includes an aircraft deployment assembly comprising a fuselage, a deployable wing pivotably coupled to the fuselage about an axis of rotation, the wing rotatable between a first rotational orientation and a second rotational orientation different from the first rotational orientation, the wing extending along a direction substantially aligned with a longitudinal axis of the fuselage in the first rotational orientation, the wing to be extended in a lateral direction away from the fuselage in the second rotational orientation as the wing is being deployed, and an outer casing defining a cross-sectional perimeter to enclose the fuselage and the deployable wing with the wing in the first rotational orientation.

Example 19 includes the assembly of example 18, wherein the outer casing defines a cavity in a space between the fuselage, the deployable wing and the casing, the fuselage and the deployable wing to eject from the outer casing.

Example 20 includes the assembly of example 18, wherein the outer casing includes a first casing portion and a second casing portion, the deployable wing to eject from the first and second outer casing portions when the first casing portion detaches from the second casing portion.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method of deploying an aircraft, the method comprising:
   separating the aircraft from a launch vehicle, the aircraft having a wing pivotably coupled to a fuselage;
   rotating, about an axis of rotation, the wing relative to the fuselage from a first rotational orientation to a second rotational orientation different from the first rotational orientation, wherein, in the first rotational orientation, the wing extends along a direction that substantially aligns with a longitudinal axis of the fuselage; and
   extending an inflatable portion of the wing from a folded position, the inflatable portion to extend in a lateral direction away from the fuselage when the wing is rotated to the second rotational orientation.

2. The method of claim 1, wherein the axis of rotation is a first axis of rotation, and further including rotating the inflatable portion relative to the wing about a second axis of rotation.

3. The method of claim 1, wherein the inflatable portion extends in a direction substantially perpendicular to the longitudinal axis in the second rotational orientation.

4. The method of claim 1, further including:
   stowing the aircraft in the launch vehicle when the wing is in the first rotational orientation; and
   launching the launch vehicle.

5. The method of claim 4, further including rotating the wing to the first rotational orientation prior to stowing the aircraft.

6. The method of claim 4, wherein the fuselage of the stowed aircraft includes a channel to store a chute, the chute deployable when the wing is in at least one of the first rotational orientation or the second rotational orientation.

7. An assembly for use with an aircraft, the assembly comprising:
- a fuselage; and
- a deployable wing pivotably coupled to the fuselage about an axis of rotation, the wing rotatable between a first rotational orientation and a second rotational orientation different from the first rotational orientation, the wing extending along a direction substantially aligned with a longitudinal axis of the fuselage in the first rotational orientation, an inflatable portion of the wing to be extended from a folded position along a lateral direction away from the fuselage as the wing is rotated to the second rotational orientation.

8. The assembly of claim 7, wherein the axis of rotation is a first axis of rotation, and further including a first wing portion pivotably coupled to the wing about a second axis of rotation.

9. The assembly of claim 8, wherein the second axis of rotation is substantially parallel to the longitudinal axis of the fuselage when the wing is rotated to the second rotational orientation.

10. The assembly of claim 7, wherein the first rotational orientation is a stowed position in which the inflatable portion is folded to contact the fuselage.

11. The assembly of claim 7, wherein the second rotational orientation is a deployed position in which the inflatable portion is rotated away from the fuselage.

12. The assembly of claim 8, further including second and third wing portions, the second wing portion pivotably coupled to the first wing portion.

13. The assembly of claim 7, wherein the wing extends substantially perpendicular to the longitudinal axis in the second rotational orientation.

14. The assembly of claim 7, wherein the wing is at least one of a rigid spar or a telescoping spar.

15. The assembly of claim 7, further including a channel of the fuselage to store a chute.

16. The assembly of claim 9, further including a pivot point to pivotally couple the wing to the fuselage.

17. An aircraft deployment assembly comprising:
- a deployable wing pivotably coupled to a fuselage about an axis of rotation, the wing rotatable between a first rotational orientation and a second rotational orientation different from the first rotational orientation, the wing extending along a direction substantially aligned with a longitudinal axis of the fuselage in the first rotational orientation, an inflatable portion of the wing to be extended from a folded position along a lateral direction away from the fuselage in the second in response to the wing being rotated to the second rotational orientation; and
- an outer casing defining a cross-sectional perimeter to enclose the fuselage and the deployable wing with the wing in the first rotational orientation.

18. The assembly of claim 17, wherein the outer casing defines a cavity in a space between the fuselage, the deployable wing and the casing, the fuselage and the deployable wing to eject from the outer casing.

19. The assembly of claim 17, wherein the outer casing includes an outer casing portion, the deployable wing to eject from the outer casing portion when the outer casing portion detaches from the outer casing.

20. The method of claim 6, further including deploying the chute when the wing is substantially parallel to the longitudinal axis of the fuselage.

21. The assembly of claim 12, wherein the inflatable portion is a first inflatable portion, and wherein the second wing portion includes a second inflatable portion and the third wing portion includes a third inflatable portion.

22. The assembly of claim 12, wherein the second and third wing portions include winglets, the winglets disposed on distal ends of the second and third wing portions.

\* \* \* \* \*

UNITED STATES PATENT AND TRADEMARK OFFICE
CERTIFICATE OF CORRECTION

PATENT NO. : 11,780,556 B2
APPLICATION NO. : 17/526641
DATED : October 10, 2023
INVENTOR(S) : Tao et al.

It is certified that error appears in the above-identified patent and that said Letters Patent is hereby corrected as shown below:

In the Claims

Column 10, Claim 6, Line 67, Delete "stowed".

Signed and Sealed this
Twenty-first Day of November, 2023

Katherine Kelly Vidal
*Director of the United States Patent and Trademark Office*